United States Patent
Deng et al.

(10) Patent No.: US 9,431,186 B2
(45) Date of Patent: Aug. 30, 2016

(54) CLUTCH DEVICE OF GEAR TRANSMISSION SYSTEM OF CIRCUIT BREAKER SPRING OPERATING MECHANISM

(71) Applicant: CHINA XD ELECTRIC CO., LTD, Xian (CN)

(72) Inventors: Hongxiang Deng, Xian (CN); Jufang Su, Xian (CN); Qiang Zhang, Xian (CN); Zengrui Ma, Xian (CN)

(73) Assignee: CHINA XD ELECTRIC CO., LTD, Xian (CN)

( * ) Notice: Subject to any disclaimer, the term of this patent is extended or adjusted under 35 U.S.C. 154(b) by 0 days.

(21) Appl. No.: 14/383,343

(22) PCT Filed: Sep. 23, 2013

(86) PCT No.: PCT/CN2013/083971
§ 371 (c)(1),
(2) Date: Sep. 5, 2014

(87) PCT Pub. No.: WO2014/044222
PCT Pub. Date: Mar. 27, 2014

(65) Prior Publication Data
US 2015/0187520 A1    Jul. 2, 2015

(30) Foreign Application Priority Data
Sep. 24, 2012    (CN) .......................... 2012 1 0359126

(51) Int. Cl.
*H01H 3/30*    (2006.01)
*H01H 3/58*    (2006.01)
(Continued)

(52) U.S. Cl.
CPC ............... *H01H 3/58* (2013.01); *F16H 33/00* (2013.01); *H01H 3/3005* (2013.01); *H01H 3/3031* (2013.01); *H01H 3/40* (2013.01);
(Continued)

(58) Field of Classification Search
CPC ...................................................... F16H 33/06
USPC ................ 74/435, 437, 577 R, 462; 200/501
See application file for complete search history.

(56) References Cited

U.S. PATENT DOCUMENTS

| 5,595,287 A | 1/1997 | Niklaus |
| 6,066,820 A | 5/2000 | Niklaus |

(Continued)

FOREIGN PATENT DOCUMENTS

| CH | EP 0651409 A1 * | 5/1995 | ............... H01H 3/30 |
| CN | 88102715 A | 11/1988 | |

(Continued)

*Primary Examiner* — William C Joyce
*Assistant Examiner* — Randell J Krug
(74) *Attorney, Agent, or Firm* — Remarck Law Group PLC

(57) ABSTRACT

A clutch device of a gear transmission system of a circuit-breaker spring operating mechanism includes an energy storage shaft, a large gear, and a small gear. At an energy storage holding position of the large gear, a toothless and special teeth area is arranged corresponding to the small gear. A clutch cam is provided in a cavity in the large gear at the area and a backward extended part and may be reset by a resetting spring. In the area, the large gear includes a first special tooth, a second special tooth, and a space between the first and second special teeth. When energy storage is completed, the small gear pushes the first special tooth to push the large gear and energy storage shaft to the energy storage holding position that is away from a friction dead zone, and the small gear is automatically disengaged from the large gear.

16 Claims, 8 Drawing Sheets

(51) Int. Cl.
*F16H 33/00* (2006.01)
*H01H 3/40* (2006.01)
*H01H 3/42* (2006.01)
*F16H 3/00* (2006.01)

(52) U.S. Cl.
CPC ............... *H01H 3/42* (2013.01); *F16H 3/002* (2013.01); *H01H 2003/3063* (2013.01); *H01H 2003/3084* (2013.01)

(56) References Cited

U.S. PATENT DOCUMENTS 6,809,729 B2 * 10/2004 Greasley ............... G06T 15/506
                                                            345/426
7,319,203 B1 * 1/2008 Briggs ..................... H01H 3/26
                                                            200/17 R
8,124,901 B2 * 2/2012 Toba ........................ H01H 3/30
                                                            200/400

FOREIGN PATENT DOCUMENTS

| | | |
|---|---|---|
| CN | 1012863 B | 6/1991 |
| CN | 1230758 A | 10/1999 |
| CN | 1074851 | 11/2001 |
| CN | 1159740 | 7/2004 |
| CN | 201144799 Y | 11/2008 |
| CN | 101627452 A | 1/2010 |
| CN | 102867663 A | 1/2013 |
| EP | 0294561 A2 | 12/1988 |
| EP | 0651409 A1 | 11/1993 |
| EP | 0917168 A1 | 5/1999 |

* cited by examiner

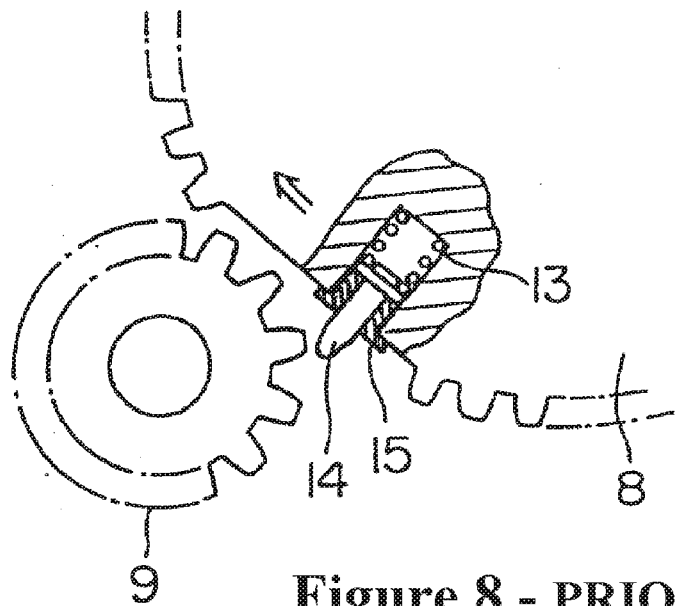
Figure 8 - PRIOR ART
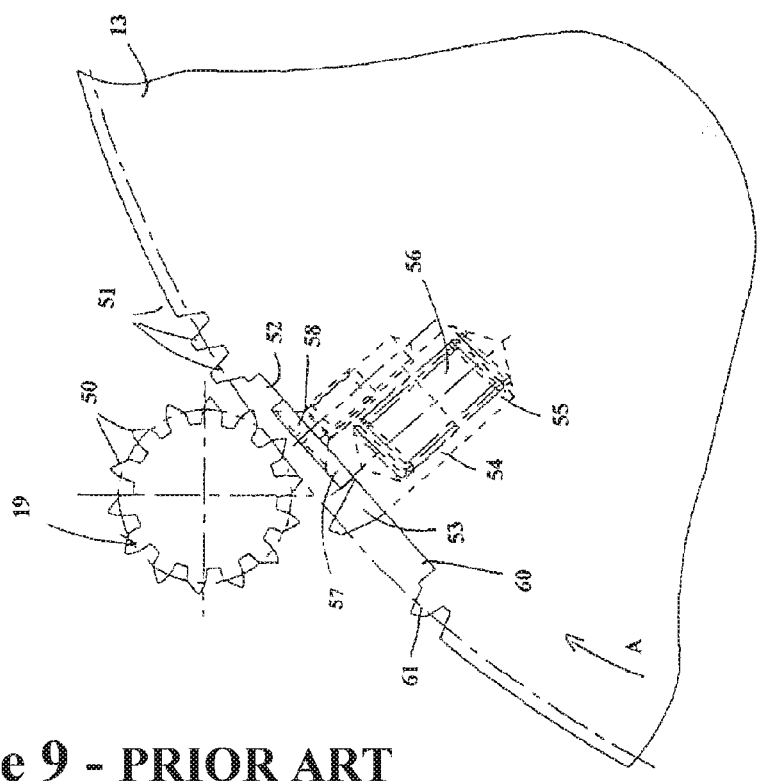
Figure 9 - PRIOR ART

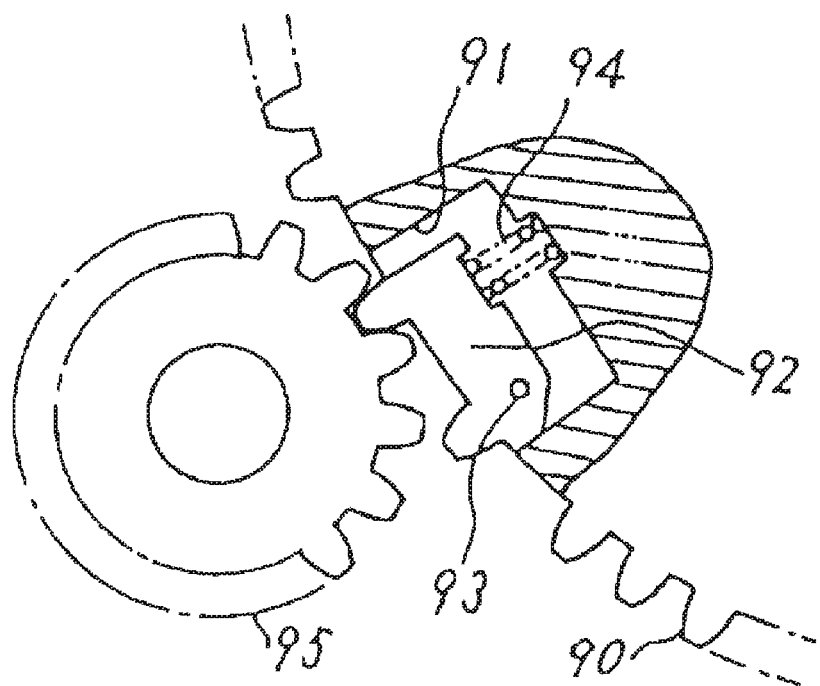
Figure 10 - PRIOR ART

CLUTCH DEVICE OF GEAR TRANSMISSION SYSTEM OF CIRCUIT BREAKER SPRING OPERATING MECHANISM

The present application is the national phase of International Application No. PCT/CN2013/083971, titled "CLUTCH DEVICE OF GEAR TRANSMISSION SYSTEM OF CIRCUIT BREAKER SPRING OPERATING MECHANISM", filed on Sep. 23, 2013, which claims the benefit of priority to Chinese patent application No. 201210359126.9 titled "CLUTCH DEVICE OF GEAR TRANSMISSION SYSTEM OF CIRCUIT-BREAKER SPRING OPERATING MECHANISM", filed with the Chinese State Intellectual Property Office on Sep. 24, 2012, the entire disclosures of both applications being incorporated herein by reference.

FIELD

The present application relates to the technical field of circuit breakers, and particularly relates to a clutch device of a gear transmission system of a circuit-breaker spring operating mechanism.

BACKGROUND

Generally, an energy storage transmission system of a circuit-breaker spring operating mechanism is required to have a clutch device, such that when the energy storage process is completed and an energy storage shaft stops rotating, the transmission system can be automatically disengaged from the energy storage shaft by the clutch device; and when a closing spring releases energy to perform a rapid closing action to drive the energy storage shaft to rotate or when the closing action is finished and the energy storage process is performed again, the energy storage shaft can be automatically connected to the transmission system by the clutch device so as to store energy successfully.

In the conventional spring operating mechanism, there are two types of devices for realizing the above clutching function. A first type of transmission systems is provided with a one-way controllable transmission component, such as a ratchet-and-pawl mechanism, or other intermittent transmission components, a mechanism having a driving pawl capable of rotating for a full circle and a driving wheel, a one-way clutch capable of controlling the clutching action, or a mechanism having a face clutch member and a one-way clutch. In addition to a reduction transmission gear, the first type of transmission systems also requires additional one-way transmission members and requires an additional component arranged outside a space of a main transmission chain to control the clutch action. Hence, the first type of transmission systems has a complex transmission structure, a high cost, and a large size. Furthermore, since the intermittent transmission mechanism, such as the ratchet wheel, may significantly reduce the transmission efficiency, the power of a driving electric motor has to be greatly increased to complete the energy storage process in a specified allowable operating time. A second type of transmission systems only employs gears for speed-reduction transmission (a chain wheel or a worm wheel may be further used), and a clutch device is provided inside a large gear and a small gear engaged with each other in a main transmission chain. The second type of transmission systems does not include an external transmission component or clutch controlling component. Hence, the second type of transmission systems has a simple structure, a small size and dose not have the disadvantages of the first type of transmission systems.

Examples of the conventional clutch device arranged inside a large gear and a small gear are shown in FIGS. 8, 9 and 10. In FIGS. 8 and 9, a clutch device having a retractable tooth is arranged at a toothless area of the large gear, and in a closing holding position, the toothless area is facing the small gear. When the driving electric motor is powered off, the small gear may continue to rotate under the inertia and stop randomly at any position, thus if the small gear stops at a position where tooth tips of these two gears are in contact with each other, when the large gear rotates again to reengage with the small gear in the rapid closing action and the small gear is engaged with a normal tooth of the large gear, the teeth of these two gears will be stuck and the closing action cannot be achieved. However, for the clutch device having the retractable tooth, the tooth tip of the small gear is firstly brought into contact with a tooth tip of the retractable tooth, and when the large gear rotates, the retractable tooth may retract, thereby achieving the reengagement successfully. In the clutch device shown in FIG. 8, the teeth of the small gear, the teeth at two sides of the toothless area of the large gear, and the retractable tooth all have a normal tooth profile. According to analysis, if the small gear rotates under the inertia and then stops at a specific position where the toot tip of the small gear may be brought into contact with the tooth tip of the large gear when the small gear reengages with the large gear, and although the retractable tooth of the large gear which is firstly brought into contact with the small gear may retract, a frictional force between the tooth tips may drive the small gear to rotate, thus it is still possible that the tooth tip of the normal tooth of the small gear may be brought into contact with the normal tooth of the large gear behind the retractable tooth, and the gears may be stuck. The clutch device in FIG. 9 provides solutions for overcoming the above stuck problem having a small probability of occurrence. One important solution, which is significantly different from the clutch device in FIG. 8, is that, tooth tips of the small gear, a tooth tip of the retractable tooth and a tooth tip of a first fixed tooth located rearward of an additional neutral position (toothless position) at the rearward of the retractable tooth are all designed to have inclined surfaces with involute profile surfaces on both sides of the tooth intersecting with each other, thereby solving the stuck problem. A main purpose of the clutch device in FIG. 10 invented later is also to overcome the stuck problem of the clutch device in FIG. 8. In the clutch device shown in FIG. 10, the single retractable tooth in FIG. 8 is modified as a swingable tooth which is a teeth combination having two normal teeth at two sides and one toothless area at the middle, and the swingable tooth can swing inwards to achieve the reengagement. Since the clutch device shown in FIG. 10 still uses teeth of normal tooth profiles, it still has some imperfections, and a main imperfection is that the swingable tooth is subjected to a large impact force, thus special materials and manufacturing processing methods are required to make the swingable tooth, which increases the cost. Subsequently, a clutch device is provided to replace the clutch device in FIG. 10, and this clutch device is the clutch device of the first type of transmission systems having a face clutch member and a one-way clutch, this clutch device has a high reliability, but the structural complexity, the volume and the cost thereof are greatly increased. For the clutch devices in FIGS. 8, 9 and 10, when the small gear stops at some positions, in the rapid closing action for reengagement, the large gear needs to rotate idly over a large angle (approximate to one pitch or even greater than one pitch), then the retractable tooth or the swingable tooth can be brought into contact with the static small gear. In such process, the closing spring having a large power releases a large amount of energy, which generates a large impact force when the retractable tooth or the swingable tooth is brought into contact with the small gear. In each of these clutch devices, no small arc transition surface is provided at a transition area between surfaces of the tooth tip, thus the contact stress at the tooth tip is large, which requires both of the above movable teeth to have a high impact strength. If a spring operating mechanism, with a greatly increased operating power or a large operating power, employs the clutch devices described above, since the large gear rotates idly in the rapid closing action for reengagement and the energy released by the closing spring is greatly increased, the impact force on the movable tooth is greatly increased, and the requirement for the impact strength of the movable tooth is accordingly greatly increased, and may be increased to such a degree that is hard to reach. In order to enable the large gear to bear a greatly increased torque without overly increasing a diameter thereof and overly reducing a transmission ratio between the large gear and the small gear, the gear should have a large module and a large tooth width, and the number of teeth of each the large gear and the small gear has to be greatly reduced, which may further increase the idling angle of the large gear and the impact force in the rapid closing action for reengagement. Furthermore, according to diagram analysis, if the small gear has less teeth, both the clutch devices in FIGS. 8 and 10 cannot avoid the possible situation (with a small probability) that the closing action cannot be achieved since the gears are stuck.

SUMMARY

In order to solve the above problems, the present application provides a clutch device adapted to a gear transmission system of a circuit-breaker spring operating mechanism with a large operating power, a super-large operating power, a medium operating power, or a small operating power. The clutch device is arranged inside a large gear and a small gear. Due to the clutch device, when an energy storage process of a closing spring is completed, the small gear may push the large gear to an energy storage holding position reliably and the small gear may be automatically disengaged from the large gear, and when the closing spring releases energy to perform the rapid closing action to drive the large gear to rotate, the large gear and the small gear may reengage with each other reliably and stably. A situation that, the large gear and the small gear are stuck and the closing action can not be achieved, will not occur no matter where the small gear stops after rotating under the inertia when a driving electric motor is powered off. A movable clutch cam in the transmission device is only subjected to an impact caused by a small idling angle of the large gear, and since the impact force is small, the requirement for the impact strength of the clutch cam is low, and the clutch cam may have a small size which reduces the cost. Furthermore, tooth tips of teeth, in an area for performing clutching, of the large gear and the small gear, and a tip of the movable member are each provided with a small arc transitional surface, thereby avoiding a damage caused by high contact stress of sharp tips.

In order to achieve the above objects, the present application provides the following technical solutions:

A clutch device of a gear transmission system of a circuit-breaker spring operating mechanism, includes an energy storage shaft fixedly connected with a closing driving cam, a large gear fixedly connected to the energy storage shaft, and a small gear configured to engage with the large gear and to be driven by an electric motor via a reduction gear, wherein a part of the large gear that is facing the small gear in an energy storage holding position is provided with a toothless and special tooth area; a cavity is provided inside the large gear at the toothless and special tooth area and a part of the large gear located rearward of the toothless and special tooth area, a clutch cam configured to be reset via a reset spring is provided in the cavity, the large gear has a first special tooth, a second special tooth and a neutral position between the first special tooth and the second special tooth in the toothless and special tooth area; and when the energy storage process is completed, the small gear pushes the first special tooth of the large gear to push the large gear and the energy storage shaft to the energy storage holding position which is away from a friction dead zone, and then the small gear is automatically disengaged from the large gear.

As a further improvement of the present application, the first special tooth of the large gear is located forward of the toothless and special tooth area of the large gear in a rotation direction; the first special tooth is formed from a normal tooth, located forward of the toothless and special tooth area, with a major part at a rear side being removed and a small part at a front side being remained; and a tip end where two sides of the remaining part are converged is provided with an arc transitional surface.

As a further improvement of the present application, the neutral position with one normal tooth missing is located rearward of the first special tooth of the large gear, and a forward end of the clutch cam arranged in the cavity of the large gear protrudes into the neutral position; in a reset limit position of the clutch cam, the forward end of the clutch cam is located between the missing tooth and the first special tooth; the forward end of the clutch cam is driven by the teeth of the small gear to retract into the cavity inside the large gear when the small gear rotates; and in a case that the clutch cam is not blocked when the small gear is rotating or stops, the forward end of the clutch cam is reset to the reset limit position by the reset spring of the clutch cam.

As a further improvement of the present application, the clutch cam is movably connected to a shaft pin fixed to the large gear via a hole of the clutch cam, and the hole of the clutch cam is an oblong hole.

As a further improvement of the present application, the clutch cam further includes an expanded part inclining to one side in a direction close to an axis of the large gear.

As a further improvement of the present application, the second special tooth is located at a position that is deviated forwards from a normal tooth missing at this position and closer to the neutral position.

As a further improvement of the present application, the second special tooth of the large gear has an addendum circle coaxial with an addendum circle of a normal tooth of the large gear, an addendum circle radius smaller than an addendum circle radius of the normal tooth of the large gear, a tooth depth smaller than a tooth depth of the normal tooth of the large gear, and a tooth width smaller than a tooth width of the normal tooth of the large gear, and an arc transitional surface is provided at portions where tooth surfaces at two sides of the second special tooth and the addendum circle of the second special tooth are connected.

As a further improvement of the present application, the toothless and special tooth area of the large gear is formed by removing three normal teeth of the large gear.

As a further improvement of the present application, tooth tips of all teeth of the small gear engaged with the large gear have the same shape, and an inclined surface is provided on a forward side of the tooth tip of each tooth of the small gear in the rotation direction and forms an acute angle with a symmetric centerline of the tooth, and an arc transitional surface is provided at portions where the inclined surface and involute tooth surfaces at two sides of the tooth are connected.

As a further improvement of the present application, a tooth number of the small gear is equal to or greater than 8.

As a further improvement of the present application, two sides of the forward end of the clutch cam are two arc surfaces; a distance between the two arc surfaces of the forward end is smaller than the tooth width of the normal tooth of the large gear; an outer side of the forward end of the clutch cam has an inclined surface inclining towards the inside of the large gear from rear to front, and an arc transitional surface is provided at portions where the inclined surface and the two arc surfaces at the two sides are connected.

As a further improvement of the present application, the reset spring of the clutch cam is a spiral compressed spring which may or may not have a guiding rod.

As a further improvement of the present application, the reset spring of the clutch cam may be a torsion spring or a leaf spring.

The clutch cam may rotate and swing around the shaft pin arranged on the large gear in the area of the cavity. A stop pin is further provided on the large gear for defining a reset position for the outward swinging of the clutch cam in the direction of the radius.

The clutch device of the present application may be adapted to a spring operating mechanism, the rest part of which has different structures, and the opening and closing spring of the mechanism may be in any type, such as a spiral spring, a coil spring, a disc spring, a torsion-bar spring.

The large gear has a neutral position, with one normal tooth missing, in the middle of the toothless and special tooth area, and two special teeth are respectively provided forward and rearward of the missing tooth. The special tooth located forward of the missing tooth in the rotation direction is a first special tooth. The first special tooth is formed from a normal tooth located at this position with a major part at a rear side being removed and a small part at a front side being remained; and a tip end where two sides of the remaining part are converged is provided with an arc transitional surface, and the shape and size of the remaining part should guarantee to match with the size of the maximum outer circle of the small gear. The electric motor is powered to rotate and makes the closing spring to store energy through the gear transmission system, and when the energy storage process of the closing spring approaches the energy storage holding position, the small gear forcibly pushes the large gear and the energy storage shaft to pass through a dead point and further go beyond a friction dead zone by a suitable small angle, and thus the large gear may further rotate by a small angle to reach the energy storage holding position under a torque generated by the closing spring. When the gear transmission system operates, a spring hooking pin, arranged on the large gear or on other components fixedly connected to the energy storage shaft, may deform the closing spring via a lever or a chain connected to the spring hooking pin, thereby realizing the energy storage of the closing spring. When the energy storage process reaches the energy storage holding position, an energy storage holding roller provided on the large gear or other components fixedly connected to the energy storage shaft is blocked by an energy storage holding stopper provided on a bracket of the mechanism, thereby realizing the energy storage holding of the closing spring. When a closing disengagement electromagnet is energized to operate, the energy storage holding stopper may freely rotate, and the position of the energy storage holding roller cannot be limited. In this case, the closing spring releases energy and drives the energy storage shaft and the large gear to rotate, thereby performing a rapid closing action and driving the circuit-breaker to complete the closing operation. In the toothless and special tooth area of the large gear, a second special tooth is provided rearward of the missing tooth in the rotation direction. The second special tooth is located at a position that is deviated forwards from a normal tooth (missing) located rearward of the neutral position. Tooth surfaces at two sides of the second special tooth are both an arc surface which is very similar to an involute tooth surface of a normal tooth of the large gear. The second special tooth has a tooth width smaller than a tooth width of a normal tooth, an addendum circle coaxial with an addendum circle of the normal tooth and having a diameter smaller than a diameter of the addendum circle of the normal tooth, and a tooth depth much less than a tooth depth of the normal tooth. An arc transitional surface with a smaller radius is provided at portions where the two side surfaces and the arc surface at the addendum circle of the second special tooth are connected.

A clutch cam is provided in the cavity of the large gear at the toothless and special tooth area and a part close to the toothless and special tooth area, the clutch cam is rotatably connected to a shaft pin provided at a rear side of the cavity of the large gear in the rotation direction. When approaching the energy storage finishing position and the energy storage holding position, the clutch cam is pushed by the teeth of the rotating small gear to swing towards the inside of the cavity, and thus does not interfere with the rotation of the small gear. When the tooth of the small gear is rotated to be disengaged from the clutch cam, the clutch cam may swing towards the outside of the cavity to be reset by the reset spring arranged inside a forward part of the cavity of the large gear. The reset position of the clutch cam in the reset swinging process is limited by a stop pin arranged inside a forward and outward portion of the cavity of the large gear. In the reset position, a forward end of the clutch cam is located at a position which is deviated forwards in the rotation direction from the missing tooth of the large gear by a suitable angle. Two sides of the forward end of the clutch cam are two arc surfaces with a large radius, and a distance (i.e., the width) between the two arc surfaces of the forward end is much less than the tooth width of the normal tooth of the large gear. An outer side of the forward end of the clutch cam has an inclined surface inclining towards the inside of the large gear from rear to front, and an arc transitional surface with a small radius is provided at portions where the inclined surface and the two arc surfaces at the two sides are connected. When the clutch cam is in the reset position, the forward end thereof is located inside the addendum circle of the large gear and is spaced apart from the addendum circle by a large distance. The hole of the clutch cam which is movably connected to the shaft pin of the large gear is not a normal round hole, but is an oblong hole composed of two adjacent semi-circles. A line connecting two centers of the two semi-circles inclines towards the outside of the large gear appropriately in a direction from rear to front. Additionally, the clutch cam is further provided with a larger part having a larger volume and protruding towards the inside of the large gear.

Tooth tips of all teeth of the small gear engaged with the large gear have the same shape, and an inclined surface is provided on a forward side of the tooth tip of each tooth of the small gear in the rotation direction and forms an acute angle with a symmetric centerline of the tooth, and an arc transitional surface with a small radius is provided at portions where the inclined surface and involute tooth surfaces at two sides of the tooth are connected. The largest distance from the tooth tip to an axis of the small gear is slightly smaller than the radius of the addendum circle of the normal tooth.

Furthermore, when the present application is used in a spring operating mechanism with a large operating power or a super large operating power, the large gear and the small gear in the clutch device should have a larger module, a larger transmission ratio, and less teeth (in particular, the small gear has especially less teeth). Both gears may employ a gear with a positive addendum modification and having a greater modification coefficient, such that the gears may transmit high torque or extreme high torque without having a larger diameter.

Compared to the conventional technology, the present application has the following advantages.

1) When the closing spring approaches the energy storage holding position, the small gear is automatically disengaged from the large gear, so as to ensure that when the driving electric motor is powered off (even cannot be powered off due to an unexpected failure) and rotates under the inertia, the closing holding components and all of other components will not be subjected to an additional impact force generated by the inertia of the rotation of the electric motor.

2) When the energy storage process of the closing spring approaches the energy storage holding position, the small gear may certainly push the large gear and the energy storage shaft to reach a suitable position, and the large gear and the energy storage shaft may certainly be driven by the torque generated by the closing spring to rotate over a suitable small angle to reach the energy storage holding position. Thus, the reliability and stability of the completion of the energy storage process is ensured, which avoids the situation that in order to ensure the reliability of the completion of the energy storage process, the closing spring has to drive the device to rotate by a larger angle due to the limitation of structural characteristics of the conventional clutch device which may cause a large impact force.

3) When the energy storage process reaches the energy storage holding position, wherever the small gear randomly stops after rotating under the inertia, the large gear and the small gear may reliably and stably reengage with each other when the large gear rotates due to the rapid closing action, and in any case, the situation, that the large gear and the small gear are stuck and the closing action cannot be achieved, will not occur.

4) When the energy storage process reaches the energy storage holding position, the small gear may randomly stop at any possible positions after rotating under the inertia. And, only in a small angle range of the above stop position of the small gear, the clutch cam (i.e., the movable component having a low strength) may be subjected to an impact generated by the energy releasing of the closing spring when the large gear is rotated idly in the reengagement process between the large gear and the small gear. The maximum idling angle of the large gear which may cause the impact is very small, and the idling of the large gear only occurs in an initial stage of the energy releasing process, and thus the impact applied to the clutch cam is very small. Therefore, the clutch cam has a low strength requirement and does not need to be manufactured by materials with high intensity or special manufacturing processing method. The clutch cam has a small size (i.e., thinner) and a low cost.

BRIEF DESCRIPTION OF THE DRAWINGS

FIGS. 4b and 4c are schematic views showing the reengagement process of the large gear and the small gear in the rapid closing action subsequent to FIG. 4a;

FIG. 8 is a schematic view showing the structure of an existing clutch device;

FIG. 9 is a schematic view showing the structure of another existing clutch device; and FIG. 10 is a schematic view showing the structure of another existing clutch device.

Figure 1:
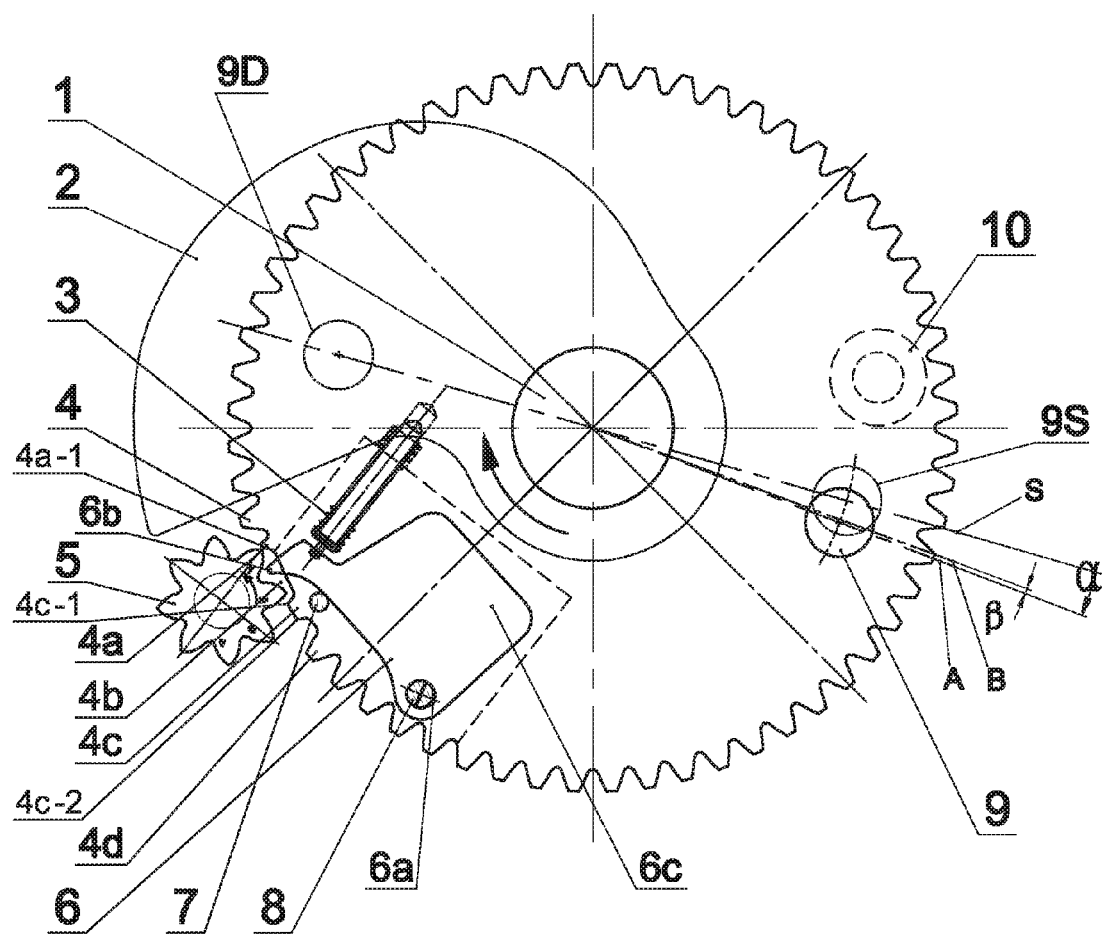
FIG. 1 is a schematic view showing a clutch device in an energy storage holding position according to the present application.

Notes: schematic views showing relative positions of the shaft pin 8 on the large gear and an oblong hole 6a of the clutch cam corresponding to different positions of the large gear and the clutch cam in all of the Figures are provided at lower parts of FIGS. 4a to 7b.

| Reference Numerals: | | | |
|---|---|---|---|
| 1 | energy storage shaft, | 2 | closing driving cam; |
| 3 | reset spring of clutch cam; | 4 | large gear; |
| 4a | first special tooth; | 4b | neutral position; |
| 4c | second special tooth; | 4d | first normal tooth; |
| 5 | small gear; | 6 | clutch cam; |
| 6a | oblong hole; | 6b | front end of clutch cam; |
| 7 | stop pin; | 8 | shaft pin; |
| 9 | spring hooking pin; and | 10 | energy storage holding roller. |

Figure 2:
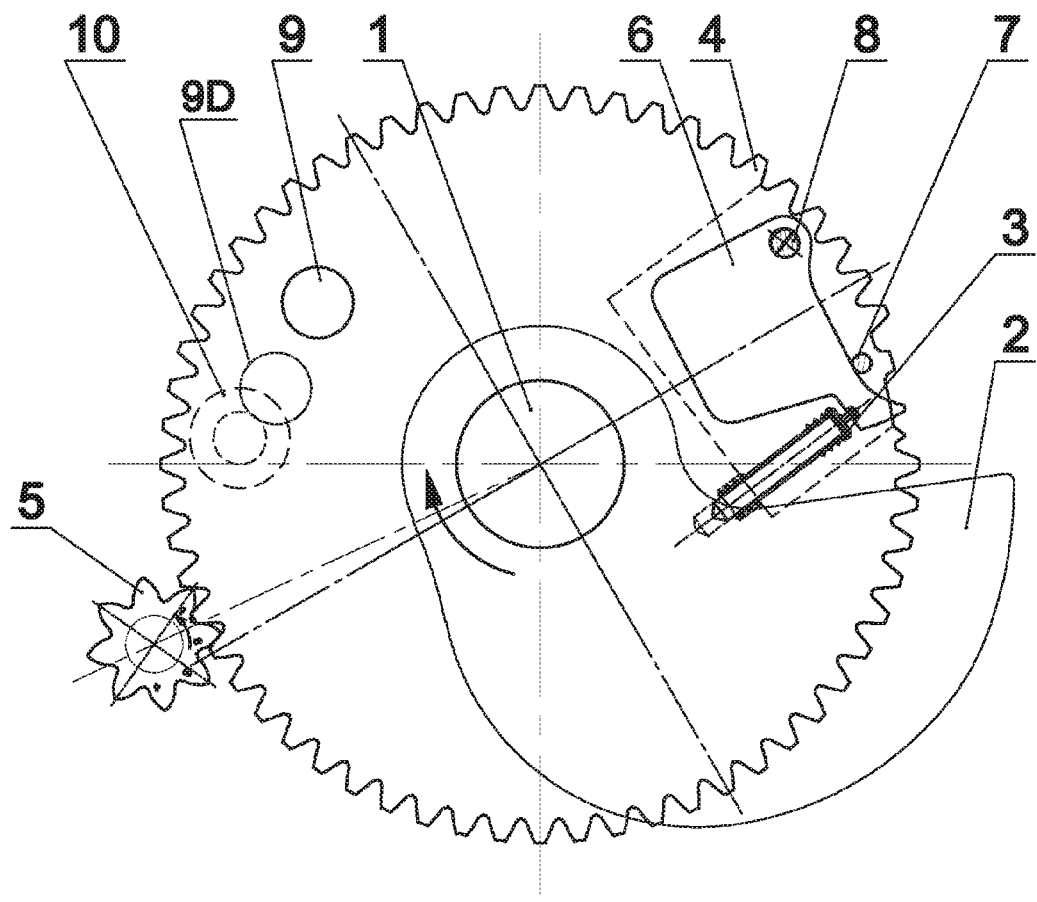
FIG. 2 is a schematic view showing a stop position of a large gear when the clutch device of the present application is in a state that a rapid closing action performed by a closing spring releasing energy is completed and an electric motor is not powered for energy storage yet.

In FIGS. 1 and 2, characters D and S are added behind reference numeral 9 to indicate two special positions of the spring hooking pin. Reference numeral 9D indicates a position of the spring hooking pin when the closing spring has the minimum deformation and the minimum stored energy. Reference numeral 9D indicates a position of the spring hooking pin when the closing spring has the maximum deformation and the maximum stored energy, that is a dead point position.

In FIGS. 4a to 7b, characters E and F are added behind the main reference numerals to indicate two different positions of the same component. If a component has three positions in the same Figure, a number or character Z may be added. The character Z indicates that a part of the component is located at a position between the position E and the position F. A number is added behind the reference numerals 5E and 5F indicating the positions of the small gear 5 (for example 5E2, 5F1) to indicate sequence number of a specific tooth in Figures.

DETAILED DESCRIPTION

Embodiments of the present application are described in detail hereinafter in conjunction with the drawings and specific examples.

As shown in FIG. 1, a clutch device of a gear transmission system of a circuit-breaker spring operating mechanism according to the present application includes an energy storage shaft 1 fixedly connected with a closing driving cam 2, a large gear 4 fixedly connected to the energy storage shaft 1, a small gear 5 configured to engage with the large gear 4 and to be driven by an electric motor via a reduction gear (the electric motor and the reduction gear are not shown), and a clutch cam 6 configured to be reset by a reset spring 3.

Figure 3A:
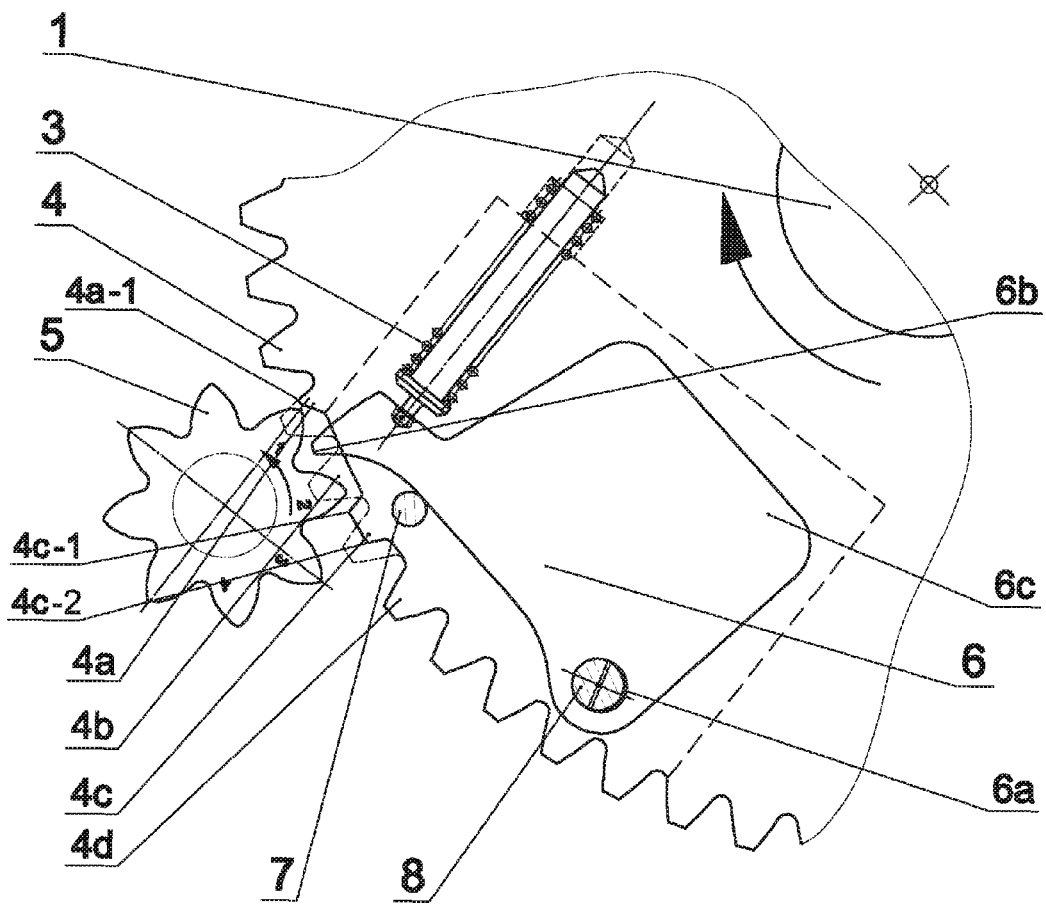
FIG. 3a is an enlarged schematic view showing structural features of main components of the clutch device according to the present application (in the energy storage holding position)
Figure 3B:
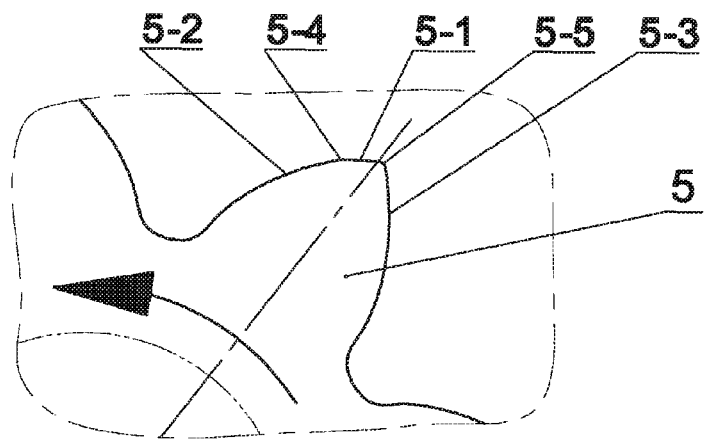
FIG. 3b is an enlarged partial view of a small gear.

As shown in FIGS. 1 and 3a, a part of the large gear 4 that is facing the small gear 5 in an energy storage holding position is provided with a toothless and special tooth area, and this area occupies a space of three normal teeth of the large gear 4. The large gear 4 is provided with an inner cavity indicated by a dashed line in Figure at the toothless and special tooth area and a part of the large gear 4 that is adjacent to and located rearward of the toothless and special tooth area in a rotation direction as shown by an arrow in Figure. The large gear 4 is provided with a stop pin 7 and a shaft pin 8 in the inner cavity. Three normal teeth missing in the toothless and special tooth area of the large gear 4 are indicated by a dashed line in FIG. 3. A first special tooth 4a of the large gear 4 is formed from a normal tooth right in front of the toothless and special tooth area with a major part at a rear side being removed and a small part at a front side being remained, and a tip end where two sides of the remaining part are converged is modified to an arc transitional surface 4a-1. A neutral position 4b formed by removing a normal tooth is located rearward of the first special tooth 4a of the large gear. A second special tooth 4c of the large gear is located rearward of the neutral position 4b. A first normal tooth 4d located rearward of the toothless and special tooth area is located right rearward of the second special tooth 4c. The second special tooth 4c is located at a position that is deviated forwards from a normal tooth (missing) located rearward of the neutral position 4b. Tooth surfaces at two sides of the second special tooth 4c are both an arc surface which is very similar to an involute tooth profile surface of a normal tooth of the large gear. The second special tooth 4c has a tooth width smaller than a tooth width of a normal tooth, an addendum circle coaxial with an addendum circle of the normal tooth and having a diameter smaller than a diameter of the addendum circle of the normal tooth, and a tooth depth much less than a tooth depth of the normal tooth (in this embodiment, the tooth depth of the second special tooth 4c is 49% of the tooth depth of the normal tooth). An arc transitional surface 4c-1, 4c-2 with a smaller radius is provided at portions where the two side surfaces and the arc surface at the addendum circle of the second special tooth are connected.

As shown in FIGS. 1 and 3a, a clutch cam 6 is provided in the inner cavity, indicated by the dashed line, of the large gear 4. The clutch cam 6 includes an oblong hole 6a composed of two adjacent semi-circles. In a reset position of the clutch cam 6, a line connecting two centers of the two semi-circles inclines towards an outer side of the large gear 4 in a direction from rear to front. The clutch cam 6 is movably connected to the shaft pin 8 on the large gear 4 via the oblong hole 6a, and the clutch cam 6 is swingable around the shaft pin 8 and may move translationally and play in a direction of the line connecting the centers of the two semi-circles. When the small gear 5 rotates in a direction as indicated by the arrow in Figure, the teeth of the small gear pushes a forward end 6b of the clutch cam to swing towards the inside of the inner cavity, and when the teeth of the small gear 5 continues to rotate and are disengaged from the forward end 6b of the clutch cam, the clutch cam 6 swings outwards to be reset under the action of the reset spring 3, and the stop pin 7 on the large gear 4 limits the reset position of the clutch cam 6. The clutch cam 6 can further include an expanded part 6c inclining to one side in a direction close to an axis of the large gear 4. When the clutch cam 6 is in the reset position, the forward end 6b of the clutch cam is located between the second missing tooth indicated by the dashed line at the neutral position 4b and the first special tooth 4a of the large gear shown in FIG. 3a. Two sides of the forward end 6b of the clutch cam are two arc surfaces with a large radius, and a distance (i.e., the width) between the two arc surfaces of the forward end is much less than the tooth width of the normal tooth of the large gear. An outer side of the forward end 6b of the clutch cam has an inclined surface inclining towards the inside of the large gear from rear to front, and an arc transitional surface with a small radius is provided at portions where the inclined surface and the two arc surfaces at the two sides are connected. When the clutch cam 6 is in the reset position, the forward end 6*b* thereof is located inside the addendum circle of the large gear and is spaced apart from the addendum circle by a large distance. Additionally, the clutch cam 6 is further provided with a larger part having a large size at a position towards the inside of the inner cavity of the large gear, and due to the inertia of the larger part, the clutch device has a better clutch performance.

As shown in FIGS. 1 and 3*a*, in the clutch device, the small gear 5 engaged with the large gear 4 is located at a position facing the toothless and special tooth area of the large gear in the energy storage holding position. Tooth tips of all the teeth of the small gear 5 have the same shape (reference may be made to the enlarged view in FIG. 3*b*). On a forward side of each tooth of the small gear 5 in the rotation direction as indicated by the arrow in the Figure, an inclined surface 5-1 is provided at the tooth tip of the tooth and forms an acute angle with a symmetric centerline of the tooth. An arc transitional surface 5-4, 5-5 with a small radius is provided at portions where the inclined surface 5-1 and involute tooth surfaces 5-2, 5-3 at the two sides of the tooth are connected. The largest distance from the outmost side of the tooth tip to an axis of the small gear 5 is slightly less than the radius of an addendum circle of a normal tooth.

In a gear transmission system including the clutch device of the present application, a one-way clutch, usually arranged in a spring operating mechanism, should be provided to ensure that the large gear and the small gear of the clutch device may rotate in only one direction as indicated by the arrow in Figure.

Hereinafter, the working principle and the clutch performance of the clutch device of the present application will be described.

The clutch device of the present application is adapted to a gear transmission system for storing energy in a closing spring in a circuit-breaker spring operating mechanism. Reference is made to FIGS. 1 and 2. When being powered, an electric motor rotates to drive the small gear 5 via a reduction gear (not shown) to rotate anticlockwise as indicated by an arrow in Figure, and the large gear 4 is driven to rotate clockwise as shown by an arrow in Figure from a stop position as shown in FIG. 2 after the rapid closing action is finished by the closing spring releasing energy until the large gear 4 reaches the energy storage holding position as shown in FIG. 1. During the rotation, a spring hooking pin 9 fixed to the large gear 4 drives the closing spring of the mechanism via a chain or a lever (not shown) to store energy. When the spring hooking pin 9 rotates to a dead point position 9S (on a dashed-and-dotted line S) in FIG. 1, the closing spring has the maximum deformation and the maximum stored energy. After the spring hooking pin 9 passes the dead point, the teeth of the small gear 5 may forcibly push the first special tooth 4*a* of the large gear 4 to go beyond a friction dead zone by a suitable small angle (the small angle, i.e., an angle β, should be properly chose to realize the following operations reliably). When the spring hooking pin 9 reaches the position on a dashed-and-dotted line B, the torque generated by the closing spring in this position is enough to drive the large gear 4 to rotate, and under the action of the closing spring, the large gear 4 further rotates by the angle β to reach the energy storage holding position on a dashed-and-dotted line A. At this time, an energy storage holding roller 10 arranged on the large gear 4 is stopped by an energy storage holding stopper (not shown) arranged on a bracket of the mechanism, thus cannot continue to rotate, thereby achieving the energy storage holding of the closing spring. Actually, as long as the spring hooking pin 9 rotates to a position just beyond a boundary of the friction dead zone (before reaching the line B in FIG. 1), the closing spring is able to drive the large gear to rotate, and the reason, that the small gear 5 is configured to forcibly push the first special tooth 4*a* to go beyond the dead zone by the suitable small angle, is to ensure the reliability of the operation and provide a necessary allowance. On the premise of ensuring the reliability of operation, the device may ensure that an angle α, by which the energy storage holding position goes beyond the dead point position, is small, and in this embodiment, the angle α is 5 degree. Due to the small angle α, the impact on the energy storage holding stopper from the energy storage holding roller 10 caused by energy releasing of the closing spring is small, and the available spring energy remained in the energy storage holding position is large, thereby avoiding disadvantages of some devices in the first and second types of clutch devices, that due to limitations of the structural characteristics, a larger angle α has to be used to ensure the reliability of the energy storage operation, which may result in a larger impact in energy releasing of the spring and an insufficient available spring energy.

Before the energy storage operation reaches the energy storage holding position shown in FIG. 1, a stroke switch is switched to power off the electric motor, however, due to the inertia, the small gear 5 continues to rotate. When reaching the energy storage holding position, as shown in FIG. 1, the small gear 5 has been disengaged from the large gear 4, and the rotation of the small gear caused by the inertia may push the forward end 6*b* of the clutch cam to retract, and the small gear 5 cannot be in contact with the large gear, thus the energy storage holding roller 10, the energy storage holding stopper and other related parts will not be subjected to an additional impact caused by the inertia of the rotating electric motor, reduction gear and small gear.

After the electric motor is powered off, the stop position of the small gear 5 after rotating under the inertia is random. Since the small gear 5 may stop at different positions, the reengagement process of the large gear 4 and the small gear 5 are different in the rapid closing action performed by the closing spring releasing energy. Wherever the small gear 5 randomly stops, the clutch device of the present application may successfully achieve a reliable and stable reengagement process. Possible stop positions of the small gear 5 are shown in FIGS. 4*a* to 7*b*, wherein some Figures illustrate a reengagement process of the small gear and the large gear in the rapid closing action after the small gear 5 stops at a certain position.

Figure 4A:
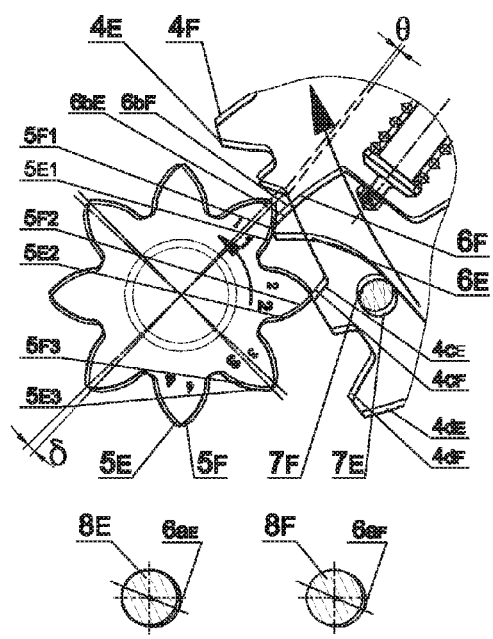
FIG. 4a is a schematic view showing stop positions, with a high probability of occurrence, of the small gear after rotating under the inertia, a range in which the clutch cam may be subjected to an impact, and an operation in an initial stage of a rapid closing action for reengagement.
Figure 4B:
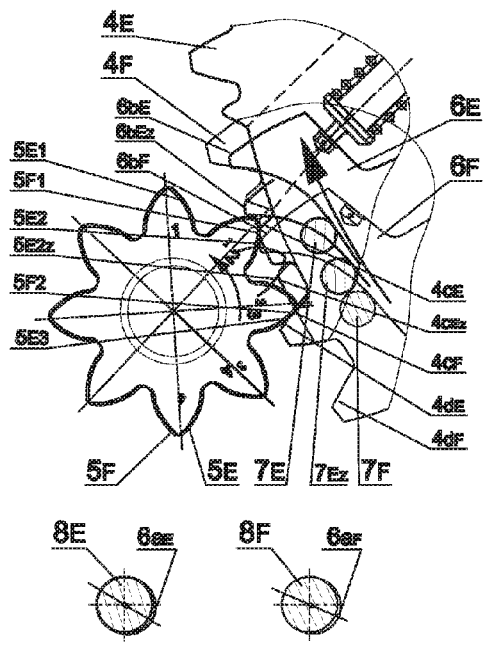
Figure 4C:
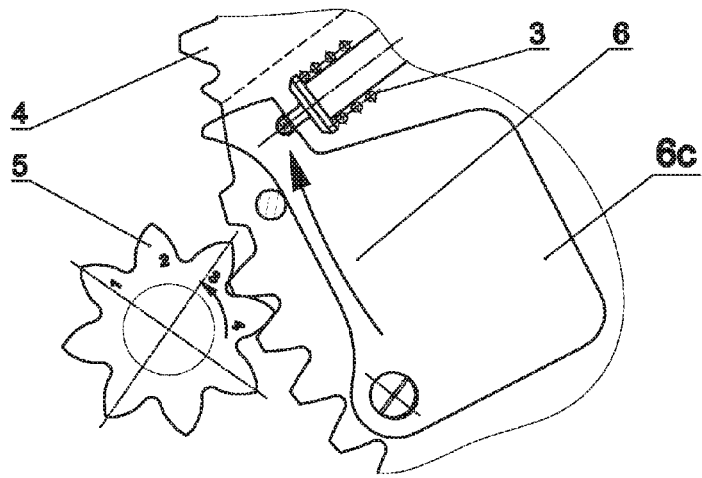

As shown in FIG. 4*a*, positions 5E and 5E1 are the most possible stop positions of the small gear 5 after the electric motor is powered off. In this case, a tooth 1 of the small gear stopping at the position 5E1 is in contact with the forward end 6*b* of the clutch cam which is in the energy storage holding position and is reset (at a position 6*b*E). In Figure, the positions 5E, 5E1 and 5F, 5F1 are boundaries at two sides of a range of positions at which the small gear may stop when the small gear is pushed by the forward end 6*b* of the clutch cam 6 to rotate in reengagement. As long as the small gear stops in this range, in the reengagement process of the large gear and the small gear realized by the rapid closing action, the forward end 6*b* of the clutch cam may firstly rotate idly by a small angle (the maximum value of the small angle is the angle θ in Figure and the minimum value of the small angle is 0 degree), and then push the tooth 1 of the small gear to rotate until the tooth 1 of the small gear rotates to the position 5F1 and the forward end of the clutch cam reaches the position 6*b*F, and at this time, the second special tooth of the large gear reaches the position 4CF and is in contact with a tooth 2 of the small gear which is at the position 5F2. In the subsequent rotation process, the forward end 6*b* of the clutch cam is disengaged from the tooth 1 of the small gear, and instead, the second special tooth of the large gear pushes the tooth 2 of the small gear to rotate. Then, as shown in FIG. 4*b*, from the position 4CF of the large gear and the position 5F2 of the small gear which are the same as that in FIG. 4*a*, the second special tooth 4C of the large gear pushes the tooth 2 of the small gear 5 to rotate to pass through middle positions 4CEZ and 5E2Z and then reach the positions 4CE and 5E2. At this time, the first normal tooth 4*d*, located rearward of the toothless and special tooth area, of the large gear 4 is rotated to the position 4*d*E and is in contact with a tooth 3 of the small gear which is rotated to a position 5E3 at the same time. In the subsequent rotation process, the second special tooth 4C of the large gear is disengaged from the tooth 2 of the small gear, and instead, the normal tooth 4*d* of the large gear 4 pushes the tooth 3 of the small gear to rotate. After this, the process is the transmission between the normal teeth of the large gear and the normal teeth of the small gear as shown in FIG. 4C.

Figure 5A:
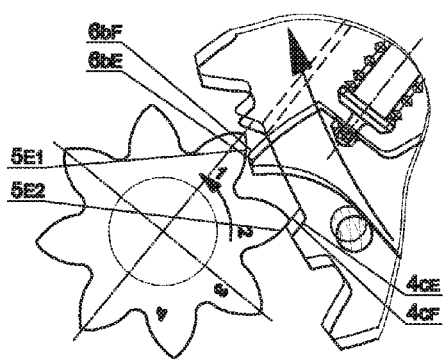
FIG. 5a is a schematic view showing that the small gear stops at a forward position in FIG. 4a after rotating under the inertia and is not in contact with the clutch cam in the energy storage holding position and teeth of the large gear and the small gear are just brought into contact with each other in the initial stage of reengagement process when the large gear is rotated by the rapid closing action to reengage with the small gear.
Figure 5A:
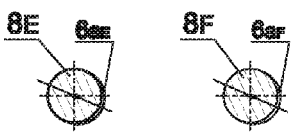

In FIG. 5*a*, after rotating under the inertia, the small gear 5 stops at positions 5E1 and 5E2 which are beyond a forward boundary of the range shown in FIG. 4*a* and where the small gear 5 is not in contact with the two sides of the forward end 6*b* of the clutch cam at the position 6*b*E. When the rapid closing action is performed for reengagement, the large gear 4 rotates idly by an angle, the second special tooth 4C of the large gear 4 rotates from the position 4CE to the position 4CF and is brought into contact with the tooth 2 of the small gear which is located at the position 5E2, and the forward end 6*b* of the clutch cam reaches the position 6*b*F, however the forward end 6*b* is still not able to contact the tooth 1 of the small gear 5 at the position 5E1 which has not been rotated. Subsequently, the second special tooth 4C of the large gear pushes the tooth 2 of the small gear to rotate, and after a process similar to that in FIGS. 4*b* and 4C, the following process is the transmission between the normal teeth of the large gear and the normal teeth of the small gear.

Figure 5B:
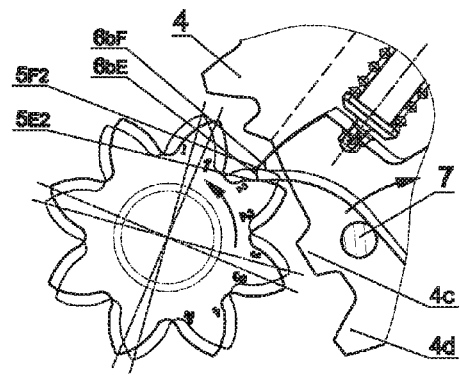
FIGS. 5b and 5c are schematic views showing several stop positions of the small gear after rotating under the inertia where the small gear pushes the clutch cam and is in contact with a rear side of a front end of the clutch cam.
Figure 5B:
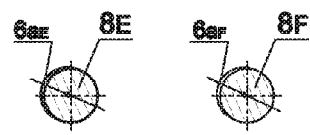
Figure 5C:
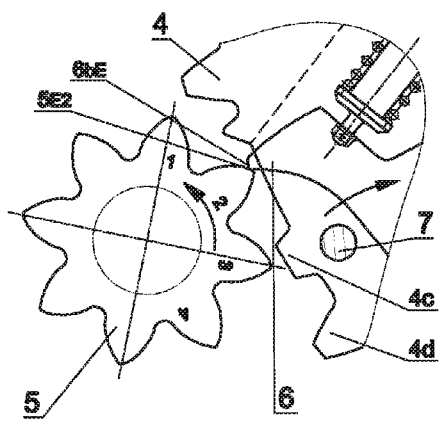
Figure 5C:
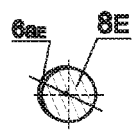

In FIGS. 5*b* and 5C, after rotating under the inertia, the small gear stops at positions which are in contact with the rearward side of the forward end 6*b* of the clutch cam. Three positions are illustrated in Figures as examples. In the position 5E2 of FIG. 5*b*, the tooth 2 of the small gear is in contact with the rearward side of the forward end 6*b* in the reset position (6*b*E). In the positions 5F2 and 6*b*F of FIG. 5*b* and the positions 5E2 and 6*b*E of FIG. 5C, the forward end 6*b* of the clutch cam is already pushed by the small gear to be disengaged from the stop pin 7 and swings inwards by a certain angle. In such positions, when the large gear 4 is rotated by the rapid closing action, the large gear 4 may rotate idly by different angles which correspond to the stop positions of the small gear 5, and the second special tooth 4C of the large gear 4 is reengaged with the tooth 2 of the small gear to drive the small gear to rotate. Subsequently, after a process similar to that in FIGS. 4*b* and 4C, the following process is the transmission between the normal teeth.

Figure 5D:
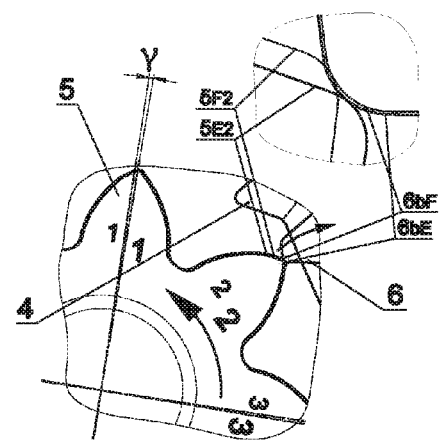
FIG. 5d is a schematic view showing the maximum range of the stop position of the small gear after rotating under the inertia, wherein in this range, the arc surface with a small radius at the tooth tip of the small gear is in contact with the arc surface with a small radius on the outmost side of the forward end of the clutch cam and the small gear and the clutch cam may be held in this position, and the clutch cam may drive the small gear to rotate by means of frictional force in the rapid closing action for reengagement.
Figure 5D:
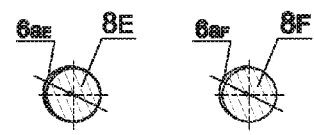

FIG. 5*d* shows the maximum range of the stop position of the small gear after rotating under the inertia, wherein in this range, the arc surface with a small radius at the tooth tip of the small gear 5 is in contact with the arc surface with a small radius on the outmost side of the forward end 6*b* of the clutch cam and the small gear and the clutch cam may be held in this position, and the clutch cam may drive the small gear to rotate by means of frictional force in the rapid closing action for reengagement. In a case that the small gear has not reached the position 5E2 (where the small gear is in contact with the forward end 6*b* of the clutch cam at the position 6*b*E) when it stops, the clutch cam cannot drive the small gear to rotate even the frictional coefficient reaches the maximum value of dry friction without a lubricant, thus in this case, the reengagement process is the same as that in FIGS. 5*b* and 5C, but the idling angle of the large gear is larger. In a case that the small gear goes beyond the position 5F2 (where the small gear is in contact with the forward end 6*b* at the position 6*b*F) when it stops, the small gear cannot stay in that position stably and may have following subsequent changes. Since the connecting hole of the clutch cam is the special oblong hole, the range shown in FIG. 5*d* may be reduced, thus an angle γ of the range, that is an angle between two boundaries at two sides of the range, is very small.

Figure 6A:
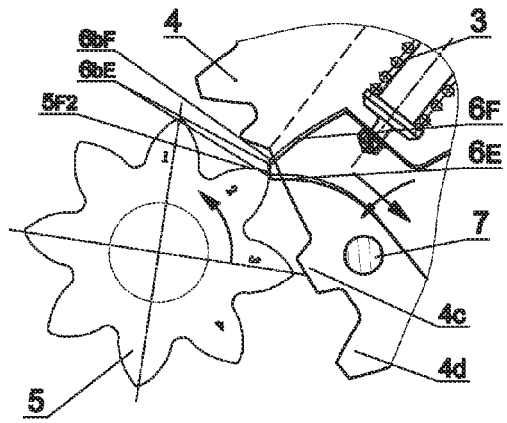
FIGS. 6a and 6b are schematic views showing a continuous changing process of positions of the small gear that the clutch cam is retracted by the reset spring and swings outwards to push the small gear to rotate until the small gear stops at positions 5E, 5E2, 6E and 6bE when the small gear stops at a position in or beyond a forward boundary of the range in FIG. 5d after rotating under the inertia.
Figure 6A:
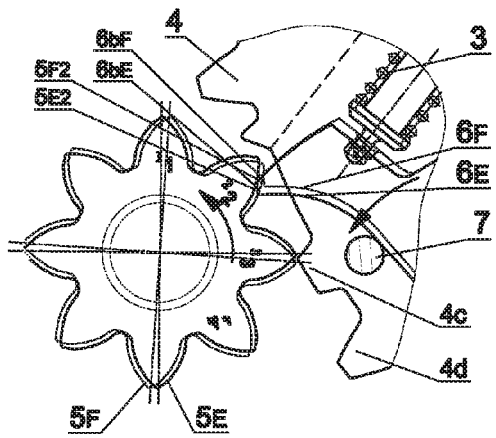
Figure 6A:
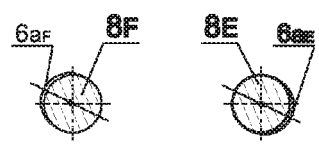
Figure 6B:
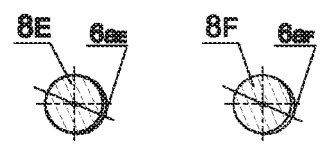

FIGS. 6*a* and 6*b* show the subsequent changes of the position of the small gear in a case that the small gear 5 stops, after rotating under the inertia, at a position on or beyond the forward boundary in the rotation direction as shown in FIG. 5*d*. When the small gear stops at such position after inertial energy of parts rotating together with the small gear are completely consumed, the clutch cam may translate rearwards in the direction as shown by the arrow in the cam of FIG. 6*a* under the spring force of the reset spring 3 of the clutch cam and the supporting force of the tooth tip of the small gear 5, and swing towards the outside under the effect of the reset spring 3. When the clutch cam translates rearwards, the oblong hole 6*a* of the clutch cam may move towards a position 6*a*E from a position 6*a*F as shown in small drawings in the lower part of FIG. 6*a* until a left gap between the oblong hole 6*a* and the shaft pin 8 is completely eliminated as shown at the positions 6*a*E and 8E, and at the same time, the forward end 6*b* of the clutch cam moves from the position 6*b*F to the position 6*b*E. Then, as shown in FIG. 6*b*, the clutch cam 6 and the forward end 6*b* thereof swing towards the outside, and when the forward end 6*b* of the clutch cam swings, the small gear 5 is driven to rotate anticlockwise as shown by the arrow, passes through the middle positions 5F2 and 6*b*F illustrated as examples and finally stops at the positions 5E2 and 6*b*E when the clutch cam 6 is stopped by the stop pin 7. In essence, the positions 5E2 and 6*b*E of the small gear and the clutch cam in FIG. 6*b* are the same as the positions 5E, 5E1 and the positions 6*e* and 6*b*E as shown in FIG. 4*a*. Due to the inertia of the small gear and other reasons, a small gap may be generated between the tooth of the small gear and the forward end 6*b* of the clutch cam. If before the reset spring 3 is pushed to shift, the small gear, after rotating under the inertia, stops at the position as shown in FIG. 6*a* that the tooth tip of the small gear is in contact with the inclined surface on the outer side of the forward end 6*b* of the clutch cam or at the position as shown in FIG. 6*b* that the rear side of the tooth of the small gear is in contact with the small arc surface on the forward side of the forward end 6*b* of the clutch cam, the clutch cam may still swing towards the outside under the action of the reset spring 3 as described above, and drive the small gear 5 to rotate until stops at the positions shown in FIG. 6*b*, that is the positions shown in FIG. 4*a*. Due to the subsequent changes, the final stop positions (the positions 5E1 and 6*b*E in FIG. 4*a*, i.e., the positions 5E2 and 6*b*E in FIG. 6*a*) have a high probability of occurrence. In the rapid closing action, the reengagement of the large gear and the small gear is achieved in processes as shown in FIG. 4a, FIG. 4b and FIG. 4c in order.

Figure 7A:
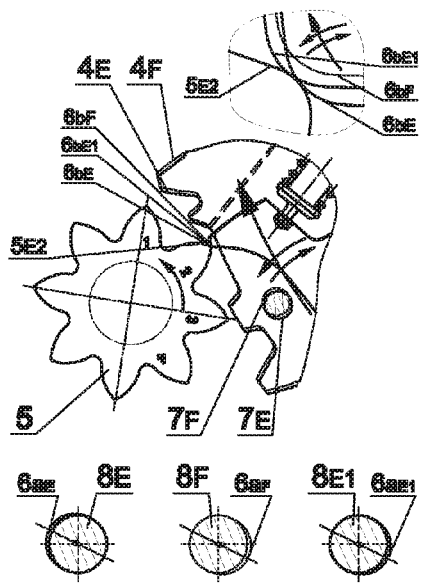
FIG. 7a is a schematic view showing a process that in the initial stage of the rapid closing action for engagement, the clutch cam, under the action of a shaft pin 8 (8E-8F-8E1), firstly swings inwards, and then swings forwards, and then swings outwards to be in contact with the small gear, when the small gear stops, after rotating under the inertia, in the range FIG. 5d.

FIG. 7a shows the operation in an initial stage of the rapid closing action for reengagement when the small gear stably stops in the range shown in FIG. 5d after rotating under the inertia. In the rapid closing action for reengagement, the large gear 4 is rotated, the shaft pin 8 on the large gear may move from a position 8E to a position 8F in the oblong hole 6a of the clutch cam as shown in the small figure at a lower part of FIG. 7a. The oblong hole 6a of the clutch cam inclines outwards, thus when the shaft pin 8 moves, the clutch cam 6 may be driven by the shaft pin 8 to swing inwards anticlockwise around a contacting point between the forward end 6b of the clutch cam and the tooth tip of the small gear. When the shaft pin 8 rotates to a position where it is in contact with the forward side of the oblong hole 6a of the clutch cam which is not rotated forward, a small impact force may urge the clutch cam having a small total mass to play forward, and at the same time, since the part of the clutch cam protruding inwards has a larger volume, mass and inertia, the acceleration of the clutch cam is small. While play forward, the clutch cam swings inwards clockwise around the shaft pin 8 and is disengaged from the tooth tip of the small gear. The inward swinging of the clutch cam in the initial stage of the rotation process of the shaft pin 8 may reinforce the clockwise swinging of the clutch cam while the clutch cam is playing. Then, the forward end of the clutch cam swings outwards under the action of the reset spring 3 and is brought into contact with the tooth tip of the small gear again, and at this time, the shaft pin 8 and the clutch cam have moved forward by a small distance, and the forward end 6b of the clutch cam has moved from the position 6bE to the position 6bE1, through the position 6bF. Due to rebound caused by the impact on the tooth tip of the small gear from the forward end 6b, a disengaging-contacting process may occur between the forward end 6b and the tooth tip of the small gear once or several times, and when the small gear and the clutch cam are finally abutted against each other stably, the clutch cam cannot dive the small gear to rotate by the friction force between the clutch cam and the tooth tip of the small gear. In such process, the shaft pin 8 rotating acceleratedly may catch up the clutch cam which is decelerated after the play, and the shaft pin 8 may strike the forward side of the oblong hole 6a again or several times, and thus the clutch cam may be located at a more forward position when the forward end of the clutch cam and the tooth tip of the small gear are abutted against each other tightly, and it is less likely that the small gear is driven to rotate by the friction force. After the initial stage of the reengagement process, the large gear 4 rotates idly by an angle, and the second special tooth 4C of the large gear 4 is brought into contact with the rear side of the tooth 2 of the small gear 5, and the small gear is pushed by the large gear 4 to rotate until the small gear is engaged with the normal teeth of the large gear as shown in FIG. 4C.

Figure 7B:
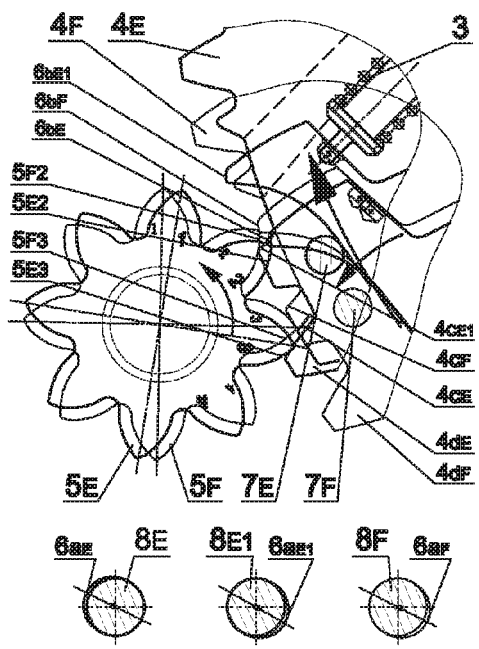
FIG. 7b is a schematic view showing a process that the reengagement process is still successfully achieved even if the clutch cam still drives the small gear to rotate in the rapid closing action due to an unexpected reason when the small gear stops, after rotating under the inertia, in the range FIG. 5d.

In a case that the small gear stops stably in the range as shown in FIG. 5b after rotating under the inertia, in such range the small gear may be driven to rotate by the frictional force, a state that the small gear will not be driven to rotate by the frictional force may be realized after performing the operation in the initial stage of the rapid closing action for reengagement as described in the above paragraph. Assuming that a situation, that the tooth tip of the small gear closely abuts against the small arc surface of the forward end 6b of the clutch cam and rotates together with the same, may occur due to some unexpected reasons, such as an extreme high frictional force, or a slight damage and deformation unexpectedly generated at the contacting point of the two small arc surfaces, and the reengagement process under this unexpected abnormal situation is shown in FIG. 7b. When the large gear 4 rotates in the rapid closing action from the stable stop position, the forward end 6b of the clutch cam may drive the small gear to rotate via the tooth tip of the tooth 2 of the small gear 5 which is in contact with the forward end 6b of the clutch cam. When the respective parts rotate from the stop positions 6bE, 5E2, 5E3, 4CE to the positions 6bF, 5F2, 5F3, 4CF, the tooth tip of the tooth 3 of the small gear 5 is brought into contact with the second special tooth 4C of the large gear at the position 4CF, and the small gear is stopped and cannot rotate any more. After this, the large gear 4 rotates idly until the second special tooth 4C thereof reaches the position 4CE1 and is brought into contact with the tooth 2 of the small gear temporarily stopping at the position 5F2. At the same time, the forward end 6b of the clutch cam rotates clockwise with the large gear, and swings outwards under the action of the reset spring 3, and then reaches the position 6bE1 after being disengaged from the tooth 2 of the small gear. Then, the small gear 5 is driven to rotate by the second special tooth 4C of the large gear. Subsequently, similar to the above-described movement and switching process after the second special tooth 4C of the large gear is brought into contact with the tooth of the small gear, the small gear is directly driven by the large gear, and finally, the process that the transmission is performed by the engagement between the normal teeth of the large gear and the small gear is performed. According to the above process, the reengagement process may be achieved smoothly and reliably even if the measure, that is provided in the initial stage of the reengagement process to make the clutch cam play and swing to prevent the small gear from being driven by the frictional force, fails.

The reengagement process, that the small gear is driven by the large gear rotated in the rapid closing action when the small gear stops at all the possible positions after rotating under the inertia, is described hereinabove. In conclusion, the clutch device of the present application has the following clutch characteristics and advantages.

1) In the energy storage operation, when the energy storage holding position is approached, the teeth of the small gear forcibly pushes the large gear to reach a suitable position which very close to the energy storage holding position, thus the energy storage operation may be realized in place reliably. If the design is proper, under the premise of ensuring the reliability of the operation, the angle α, by which the energy storage holding position goes beyond the dead point position, and the angle β, by which the large gear should be pushed by the closing spring realizing energy to reach the energy storage holding position, may each be a suitable minimum value (referring to FIG. 1). The energy of the impact generated by the energy releasing of the closing spring may be a suitable minimum value.

2) When the electric motor is powered off and the energy storage is finished, the small gear may stops at any position randomly after rotating under the inertia, and the reengagement between the large gear and the small gear may be realized smoothly when the large gear is rotated by the rapid closing action performed by the closing spring releasing energy. Wherever the small gear stops, situations, such as stuck, other abnormal situations or the situation that the closing action cannot be performed, are impossible to occur, thus the clutch device has a high reliability.

3) The small gear, after rotating under the inertia, may reach or go beyond the forward boundary in the rotation direction as shown in FIG. 5d, and due to the reset spring 3, the subsequent changes of the positions of the small gear and the clutch cam may be realized and the small gear and the clutch cam may rotate to the positions 5E1 and 6bE as shown in FIG. 4a, and the stop positions 5E1 and 6bE have a high probability of occurrence. In this embodiment, a range of the stop angle of the small gear stopping after rotating under the inertia, in which the small gear may reach the stop position 5E1 after undergoing the subsequent changes, is 18% of the total rotating angle of the small gear. In the whole process of the rapid closing action for reengagement at the stop positions 5E1 and 6bE, for all parts, there is no impact generated by the energy releasing of the closing spring which is caused by the idling of the large gear.

4) Only when the small gear stops in the range shown in FIG. 4a after rotating under the inertia, the clutch cam 6 may be subjected to the impact generated by the energy releasing of the closing spring which is caused by the idling of the large gear in the process of the rapid closing action for reengagement. When the small gear stops at most other positions, the forward end 6b of the clutch cam will not be brought into contact with the small gear in the reengagement process and thus will not be subjected to an impact. Only when the small gear stably stays in the range shown in FIG. 5d, the forward end 6b may be brought into contact with the small gear in the reengagement process, however the subsequence reengagement process is the process as shown in FIG. 7a or 7b, and in this process, the impact on the forward end of the clutch cam is so small that it is negligible. As shown in FIG. 4a, the angle δ of the range of the stop angle of the small gear stopping after rotation, in which the forward end 6b of the clutch cam may be subjected to an impact, is very small (which is only 5.5% of the angle between two adjacent teeth of the small gear in this embodiment), and correspondingly, the maximum idling angle θ of the large gear which may cause the impact is also small (which is 8.9% of the angle between two adjacent teeth of the large gear in this embodiment). Since the large gear is at a stating rotation position in the closing action, the amount of energy per unit rotation angle released by the closing spring is much lower than the amount of released energy when the large gear is at a rearward position in the closing action. Hence, the clutch cam 6 and the forward end 6b thereof are subjected to a small impact energy and a small impact force, and the clutch cam can be designed to be thinner and smaller, without using materials with high intensity or special manufacturing processing method, and thus the clutch cam has a low cost.

5) No matter what type or structure of the clutch device is used, the impact caused by the energy releasing of the closing spring when the large gear or a ratchet wheel rotates idly by a certain angle in the rapid closing action cannot be avoided. However, compared to some clutch devices, that the large impact is applied to the movable parts having a low strength and playing a critical role in the clutch process, in the clutch device of the present application, the impact is applied to the normal teeth, having a large width and a higher strength, of the large gear and the small gear, for example, the impact is applied to the second special tooth of the large gear which has a small tooth height, a large tooth width and a high strength. The tooth width of the small gear is much larger than that the tooth width of the second special tooth of the large gear and thus has a higher impact strength. The clutch device of the present application may limit the idling angle of the large gear which may cause such impact into a smaller range, and in this embodiment, the maximum idling angle of the large gear which may cause such impact is 90% of an angle occupied by one tooth, and is much less than the idling angle of the large gear of some clutch devices in which the impact is applied to the movable parts having a low strength and playing a critical role in the clutch process.

6) The device according to the present application may be adapted to a gear transmission system in which a gear ratio between the large gear and the small gear is large, and the large gear and the small gear each have a large module and tooth width, a less tooth number (in this embodiment, the tooth number of the small gear is 8), a small outer radius and may transmit a large torque, thereby providing a better precondition for developing a spring operating mechanism with a large operating power or a super large operating power. When the second type of clutch device in the conventional technology as shown in FIGS. 8, 9 and 10 is used in such gear transmission system, a problem that is hard to overcome may occur. Since the second type of clutch device in the conventional technology cannot be used, the spring operating mechanism with a large operating power or a super large operating power returns to use the first type of clutch device, which increases the complexity and cost of the mechanism.

7) The device according to the present application has a simple structure, less components, low cost and dose not occupy an additional space, thus the spring operating mechanism may has a simplified structure, a reduced size and cost.

Other Embodiments

The embodiments of the clutch device of the present application are described by the above specific examples, however, the present application is not limited to these embodiments, and may include other embodiments including the characteristics of the clutch device.

1) In the above embodiments, the spring hooking pin 9 and the energy storage holding roller 10 are fixedly or rotatably connected to the large gear 4 (referring to FIG. 1), however, these two components may also be fixedly or rotatably connected to other components which are fixedly connected to the energy storage shaft, for example a crank arm or a cam fixedly connected to the energy storage shaft.

2) In the above embodiments, the tooth number of the small gear is 8; however, in the present application, the small gear may have more teeth.

3) In the above embodiments, the reset spring 3 of the clutch device is a spiral compressed spring which may or may not have a guiding rod. Other types of spring may also be used, such as a torsion spring, a leaf spring.

4) In the above embodiments, the shape of the clutch cam 6 is shown in FIGS. 1 and 3, the clutch cam 6 may have other different shapes, and especially, the larger part thereof protruding inwards may have other different shapes.

What is claimed is:

1. A clutch device of a gear transmission system of a circuit-breaker spring operating mechanism, comprising an energy storage shaft fixedly connected with a closing driving cam, a large gear fixedly connected to the energy storage shaft, and a small gear configured to engage with the large gear and to be driven by an electric motor via a reduction gear, wherein a part of the large gear that is facing the small gear in an energy storage holding position is provided with a special tooth area; a cavity is provided inside the large gear at the special tooth area and a part of the large gear located rearward of the special tooth area, a movable clutch component configured to be reset via a reset spring is provided in the cavity, the large gear has a first special tooth, a second special tooth and a neutral position between the first special tooth and the second special tooth in the special tooth area, each of the first and second special teeth differing from normal teeth of the large gear in size or shape; and when the energy storage process is completed, the small gear pushes the first special tooth of the large gear to push the large gear and the energy storage shaft to the energy storage holding position which is away from a friction dead zone, and then the small gear is automatically disengaged from the large gear.

2. The clutch device according to claim 1, wherein the first special tooth of the large gear is located forward of the special tooth area of the large gear in a rotation direction; the first special tooth is formed from a normal tooth, located forward of the special tooth area, with a first part at a rear side being removed and a second part at a front side being remained; and a tip end where two sides of the first special tooth are converged is provided with an arc transitional surface.

3. The clutch device according to claim 1, wherein the large gear has one normal tooth missing, the neutral position is located rearward of the first special tooth of the large gear, and a forward end of the movable clutch component arranged in the cavity of the large gear protrudes into the neutral position; in a reset limit position of the movable clutch component, the forward end of the movable clutch component is located between the missing tooth and the first special tooth; the forward end of the movable clutch component is driven by the teeth of the small gear to retract into the cavity inside the large gear when the small gear rotates; and in a case that the movable clutch component is not blocked when the small gear is rotating or stops, the forward end of the movable clutch component is reset to the reset limit position by the reset spring of the movable clutch component.

4. The clutch device according to claim 1, wherein the movable clutch component is movably connected to a shaft pin fixed to the large gear via a hole of the movable clutch component, and the hole of the movable clutch component is an oblong hole.

5. The clutch device according to claim 3, wherein the movable clutch component further comprises an expanded part inclining to one side in a direction to towards an axis of the large gear.

6. The clutch device according to claim 1, wherein the second special tooth is located at a position that is deviated forwards from a normal tooth missing at this position and closer to the neutral position.

7. The clutch device according to claim 6, wherein the second special tooth of the large gear has an addendum circle coaxial with an addendum circle of a normal tooth of the large gear, an addendum circle radius smaller than an addendum circle radius of the normal tooth of the large gear, a tooth depth smaller than a tooth depth of the normal tooth of the large gear, and a tooth width smaller than a tooth width of the normal tooth of the large gear, and an arc transitional surface is provided at portions where tooth surfaces at two sides of the second special tooth and the addendum circle of the second special tooth are connected.

8. The clutch device according to claim 1, wherein the special tooth area of the large gear is formed by removing three normal teeth of the large gear.

9. The clutch device according to claim 1, wherein tooth tips of all teeth of the small gear engaged with the large gear have the same shape, and an inclined surface is provided on a forward side of the tooth tip of each tooth of the small gear in the rotation direction and forms an acute angle with a symmetric centerline of the tooth, and an arc transitional surface is provided at portions where the inclined surface and involute tooth surfaces at two sides of the tooth are connected.

10. The clutch device according to claim 2, wherein tooth tips of all teeth of the small gear engaged with the large gear have the same shape, and an inclined surface is provided on a forward side of the tooth tip of each tooth of the small gear in the rotation direction and forms an acute angle with a symmetric centerline of the tooth, and an arc transitional surface is provided at portions where the inclined surface and involute tooth surfaces at two sides of the tooth are connected.

11. The clutch device according to claim 3, wherein tooth tips of all teeth of the small gear engaged with the large gear have the same shape, and an inclined surface is provided on a forward side of the tooth tip of each tooth of the small gear in the rotation direction and forms an acute angle with a symmetric centerline of the tooth, and an arc transitional surface is provided at portions where the inclined surface and involute tooth surfaces at two sides of the tooth are connected.

12. The clutch device according to claim 4, wherein tooth tips of all teeth of the small gear engaged with the large gear have the same shape, and an inclined surface is provided on a forward side of the tooth tip of each tooth of the small gear in the rotation direction and forms an acute angle with a symmetric centerline of the tooth, and an arc transitional surface is provided at portions where the inclined surface and involute tooth surfaces at two sides of the tooth are connected.

13. The clutch device according to claim 5, wherein tooth tips of all teeth of the small gear engaged with the large gear have the same shape, and an inclined surface is provided on a forward side of the tooth tip of each tooth of the small gear in the rotation direction and forms an acute angle with a symmetric centerline of the tooth, and an arc transitional surface is provided at portions where the inclined surface and involute tooth surfaces at two sides of the tooth are connected.

14. The clutch device according to claim 6, wherein tooth tips of all teeth of the small gear engaged with the large gear have the same shape, and an inclined surface is provided on a forward side of the tooth tip of each tooth of the small gear in the rotation direction and forms an acute angle with a symmetric centerline of the tooth, and an arc transitional surface is provided at portions where the inclined surface and involute tooth surfaces at two sides of the tooth are connected.

15. The clutch device according to claim 7, wherein tooth tips of all teeth of the small gear engaged with the large gear have the same shape, and an inclined surface is provided on a forward side of the tooth tip of each tooth of the small gear in the rotation direction and forms an acute angle with a symmetric centerline of the tooth, and an arc transitional surface is provided at portions where the inclined surface and involute tooth surfaces at two sides of the tooth are connected.

16. The clutch device according to claim 8, wherein tooth tips of all teeth of the small gear engaged with the large gear have the same shape, and an inclined surface is provided on a forward side of the tooth tip of each tooth of the small gear in the rotation direction and forms an acute angle with a symmetric centerline of the tooth, and an arc transitional surface is provided at portions where the inclined surface and involute tooth surfaces at two sides of the tooth are connected.

* * * * *